United States Patent [19]
Hasegawa

[11] Patent Number: 5,557,425
[45] Date of Patent: Sep. 17, 1996

[54] FACSIMILE DEVICE FOR USE IN ISDN AND METHOD OF CONTROLLING SAME

[75] Inventor: Kenichi Hasegawa, Inagi, Japan

[73] Assignee: Fujitsu Limited, Kawasaki, Japan

[21] Appl. No.: 170,978

[22] Filed: Dec. 21, 1993

Related U.S. Application Data

[63] Continuation of Ser. No. 757,345, Sep. 10, 1991, abandoned.

[30] Foreign Application Priority Data

Sep. 10, 1990 [JP] Japan .................................... 2-239628

[51] Int. Cl.⁶ .................................... H04N 1/100
[52] U.S. Cl. ..................... 358/440; 358/436; 358/438
[58] Field of Search ..................... 358/436, 438, 358/434, 440, 468

[56] References Cited

U.S. PATENT DOCUMENTS

| | | | |
|---|---|---|---|
| 4,524,393 | 6/1985 | Ohzeki | 358/438 |
| 4,607,289 | 8/1986 | Kurokawa | 358/476 |
| 4,998,248 | 3/1991 | Matsuzaki | 379/94 |
| 5,012,470 | 8/1991 | Shoba et al. | 370/61 |
| 5,130,818 | 7/1992 | Tadakoro | 358/407 |

FOREIGN PATENT DOCUMENTS

| | | | |
|---|---|---|---|
| 0314122 | 5/1989 | European Pat. Off. | H04N 1/00 |
| 1-208967 | 8/1989 | Japan | H04N 1/32 |
| 120867 | 8/1989 | Japan | H04N 1/32 |
| 2-36657 | 2/1990 | Japan | H04M 3/50 |
| 2-121555 | 5/1990 | Japan | H04M 11/00 |
| 2121555 | 5/1990 | Japan | H04M 11/00 |
| 3-192870 | 8/1991 | Japan | H04N 1/32 |

*Primary Examiner*—Leo Boudreau
*Assistant Examiner*—Rafael Bacaros
*Attorney, Agent, or Firm*—Staas & Halsey

[57] ABSTRACT

In a first facsimile device, if a calling message does not include a called party subaddress and a subaddress of the device is stored, received image data is temporarily retained and the retained image data is either recorded or erased according to a user's instruction. In a second facsimile device, the image data are not received in the above case. a waste of recording paper due to an unnecessary recording of image data is avoided in both the first and second facsimile devices.

12 Claims, 14 Drawing Sheets

FACSIMILE DEVICE FOR USE IN ISDN AND METHOD OF CONTROLLING SAME

This application is a continuation of application Ser. No. 07/757,345, filed Sep. 10, 1991, now abandoned.

BACKGROUND OF THE INVENTION

1. Field of the Invention

The present invention relates to a facsimile device for use in an ISDN (Integrated Services Digital Network), and a method of controlling the device.

2. Description of the Related Art

The ISDN provides different types of communication services such as a telephone communication, a data communication and a facsimile transmission, on a common digital network, and is constructed according to CCITT recommendations.

In the ISDN, a plurality of terminals can be connected to a single network termination (NT) device, and when a telephone number is called, all terminals having the same attribute as that of a calling terminal, among the terminals connected to the NT device corresponding to that telephone number, transmit "response" signals to the calling terminal, and the network allows one terminal which has responded earlier than other terminals to be called. Accordingly, the calling terminal cannot appoint a specific terminal as the called terminal.

To compensate for this shortcoming, the ISDN supports the use of subaddresses and dial-in services, to thus allow the calling terminal to specify the called terminal.

In conventional facsimile devices for use in the ISDN, when the facsimile devices receive a message including a valid subaddress, a facsimile device having the same subaddress as the received subaddress responds to the message, and then receives facsimile signals to record images on a recording paper. Nevertheless, when receiving a message not including the valid subaddress, the conventional facsimile devices respond unnecessarily to the calling message. Therefore, in the facsimile device connected to the ISDN, there arises a problem in that the recording paper is wasted when receiving unnecessary image data such as mischief data and direct mail data, etc.

SUMMARY OF THE INVENTION

Therefore, an object of the present invention is to provide a facsimile device wherein a waste of recording paper due to unnecessary image data such as mischief data and direct mail data, etc., can be avoided.

In accordance with the present invention there is provided a facsimile device which receives and records messages including image data from a digital network, wherein the messages include a first identifier identifying a facsimile device for receiving the image data, and wherein a second identifier to be compared with the first identifier is stored in the device, comprising receiving means for receiving the messages from the digital network, identifier extracting means for extracting the first identifier from the messages received by the receiving means, where the messages include the first identifier, storing means for storing the second identifier, comparison means for comparing the first identifier with the second identifier where the identifier extracting means can extract the first identifier and where the second identifier is stored in the storing means, to determine whether or not the first identifier coincides with the second identifier, recording means for recording the image data, received data retaining means for retaining image data to be recorded by the recording means or to be erased according to commands input by user, and control means operating such that the receiving means receive the image data if the first identifier coincides with the second identifier or if the message does not include the first identifier, and in other cases the receiving means ignores the messages, and so that the received image data are retained in the received data retaining means if the first identifier is not included in the message and the second identifier is stored in the storing means, and in other cases the received image data is recorded by the recording means.

In accordance with the present invention there is also provided a facsimile device which receives and records messages including image data from a digital network, wherein the messages include a first identifier identifying a facsimile device for receiving the image data and wherein a second identifier to be compared with the first identifier is stored in the device, comprising receiving means for receiving the messages from the digital network, identifier extracting means for extracting the first identifier from the messages received by the receiving means, where the messages include the first identifier, storing means for storing the second identifier, comparison means for comparing the first identifier with the second identifier, where the identifier extracting means can extract the first identifier and where the second identifier is stored in the storing means, to determine whether or not the first identifier coincides with the second identifier, recording means for recording the image data, and control means operating such that the receiving means receive the image data to be recorded by the recording means if the first identifier coincides with the second identifier or if the messages do not include the first identifier and the second identifier is not stored, and in other cases, the receiving means ignore the messages.

In accordance with the present invention, there is also provided a method of controlling a facsimile device which receives and records messages including image data from a digital network, wherein the messages include a first identifier identifying a facsimile device for receiving the image data and wherein a second identifier to be compared with the first identifier is stored in the device, comprising the steps of receiving a message which, may include the first identifier, extracting the first identifier from the message if the message includes the first identifier, comparing the first identifier with the second identifier if the first identifier is extracted and the second identifier is stored, to determine whether or not the first identifier coincides with the second identifier, receiving messages including the image data if the first identifier coincides with the second identifier or if the message does not include the first identifier, and in other cases, ignoring the messages, and retaining the received image data to be recorded or to be erased according to commands input by a user if the first identifier is not included in the message and the second identifier is stored, and in other cases, recording the image data.

In accordance with the present invention, there is also provided a method of controlling a facsimile device which receives and records messages including image data from a digital network, wherein the messages also include a first identifier identifying a facsimile device for receiving the image data, and wherein a second identifier to be compared with the first identifier is stored in the device, comprising the steps of receiving a message which, may include the first identifier, extracting the first identifier from the message if the message includes the first identifier, comparing the first identifier with the second identifier if the first identifier is extracted and the second identifier is stored, to determine whether or not the first identifier coincides with the second identifier, and receiving messages including the image data to be recorded if the first identifier coincides with the second identifier or if the message does not include the first identifier and the second identifier is not stored, and in other cases, ignoring the messages.

BRIEF DESCRIPTION OF THE DRAWINGS

FIG. 7 is a diagram showing the positional orientation of FIGS. 7A and 7B.

DESCRIPTION OF THE PREFERRED EMBODIMENTS

Before describing the preferred embodiments according to the present invention, examples of the related art are given with reference to the accompanying drawings.

Figure 1:
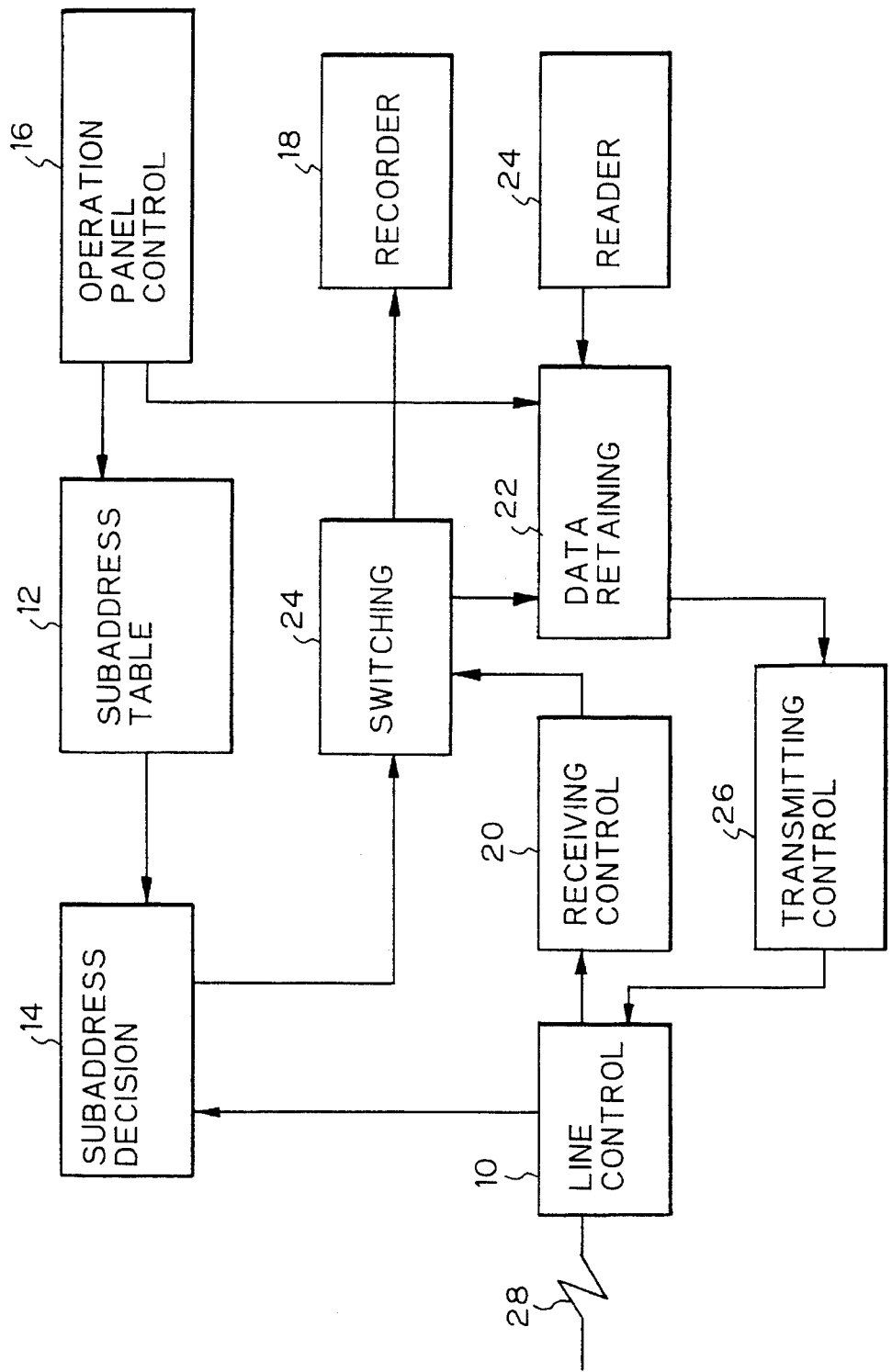
FIG. 1 is a block diagram showing a construction of a conventional facsimile device.

FIG. 1 is a block diagram showing a construction of a conventional facsimile device for use in an ISDN.

In FIG. 1, a line control unit 10 carries out a line control, a subaddress table 12 retains a subaddress of the device itself, a subaddress decision unit 14 decides whether or not a subaddress is set in the device itself, whether or not a received message includes a subaddress, and whether or not the subaddresses, if existing coincide with each other, an operation panel control unit 16 receives commands from a user, a recorder 18 records image data on a recording paper, a receiving control unit 20 controls receiving image data, a data retaining unit 22 retains the image data, a switching unit 24 connects an output of the receiving control unit 20 either to the recorder 18 or to the data retaining unit 22, to thereby record or store the received image data, a reader 23 reads image data to be transmitted, and a transmitting control unit 26 controls a transmission of image data. Reference numeral 28 denotes an ISDN (Integrated Services Digital Network).

Figure 2:
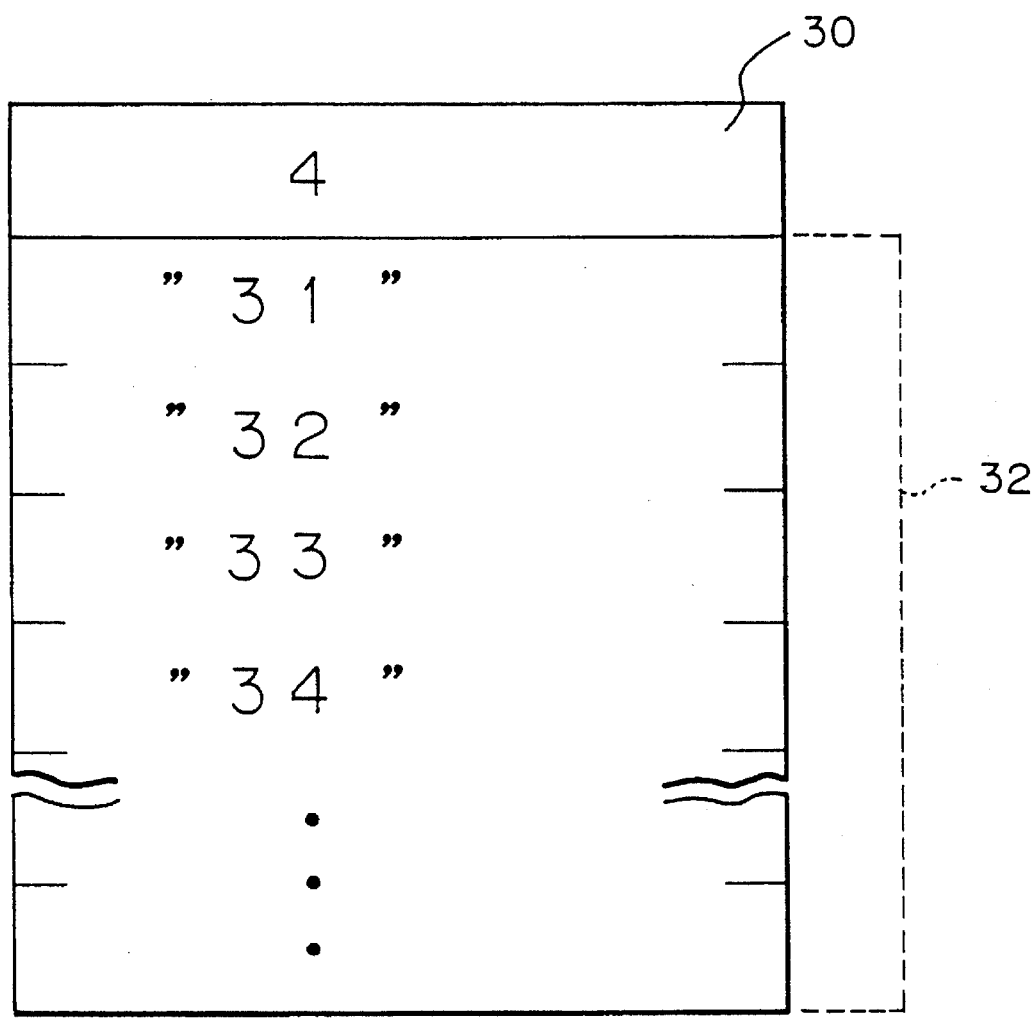
FIG. 2 is a diagram showing a construction of a subaddress table 12.

FIG. 2 shows a construction of the subaddress table 12. In the region denoted by a reference numeral 30, a number of digits of the subaddress (for example, "4" in FIG. 2) is stored, and in the following region denoted by a reference numeral 32, data of the subaddress is stored in ASCII code form or in IA5 code form. For example, four-digits of a subaddress each represented by two-hexadecimal digits "31", "32", "33", and "34", which denote numbers "1", "2", "3", and "4" respectively, are stored in FIG. 2.

Figure 3:
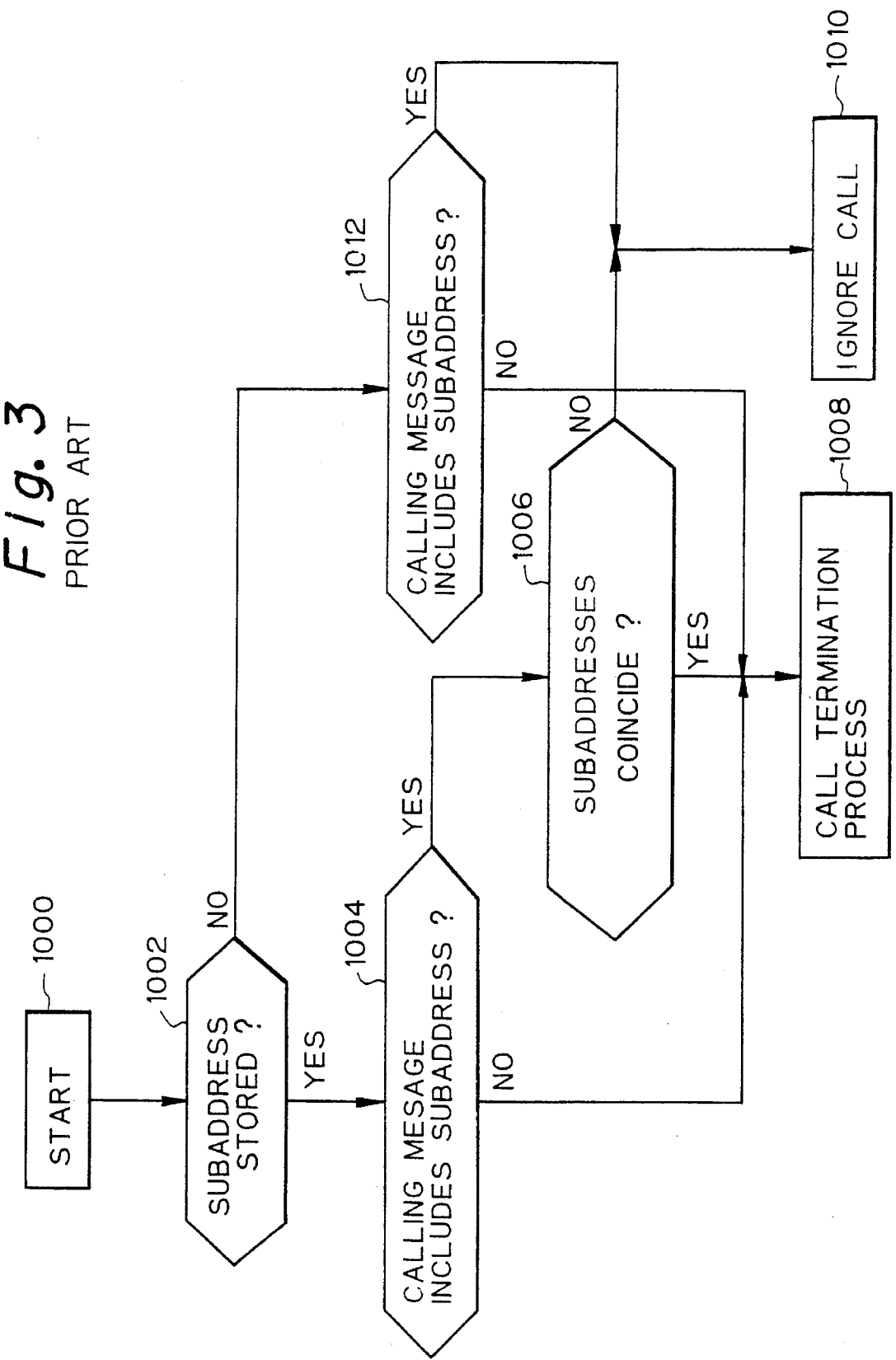
FIG. 3 is a flowchart showing an operation of the conventional facsimile device of FIG. 1.
Figure 4:
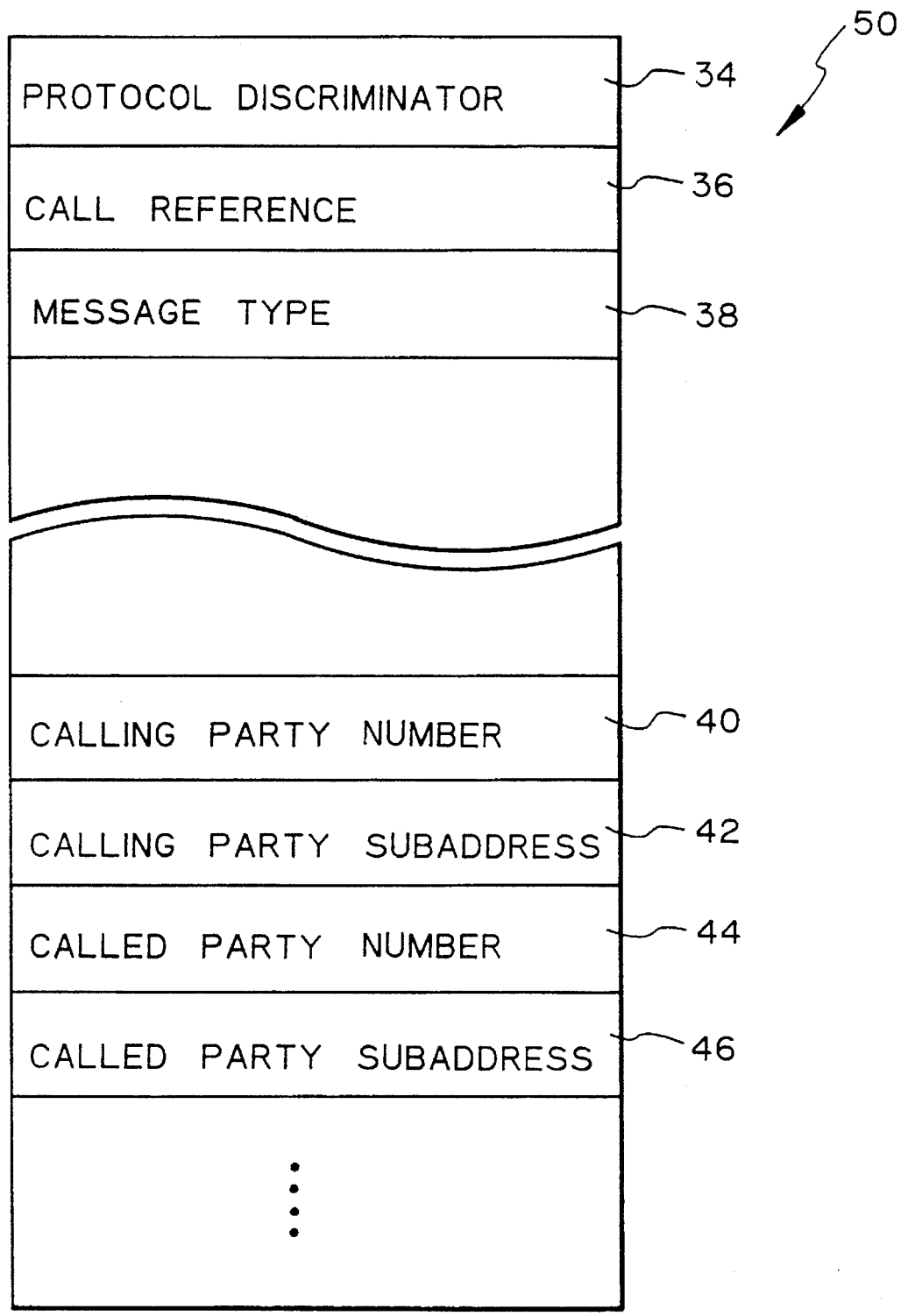
FIG. 4 is a diagram showing a construction of a SETUP message.

FIG. 3 is a flowchart showing processes in the conventional facsimile device for use in an ISDN having a construction shown in FIG. 2, and FIG. 4 is a diagram showing contents of a message 50 including data for establishing a call.

In step 1000, if the line control unit 10 receives a message including data for establishing a call shown in FIG. 4, the line control unit 10 extracts a called party subaddress 44 from the message 50 and transfers the called party subaddress 44 to the subaddress decision unit 14. The subaddress decision unit 14 refers to the subaddress table 12, the content of which is shown in FIG. 2, reads out, for example, the four-digit number specified by ASCII codes, i.e., "31", "32", "33" and "34", stored in the region 32, and compares the readout subaddress with the called party subaddress. As shown in FIG. 3, if in step 1002 and 1004 the subaddresses exist, and if in step 1006 the subaddresses coincide with each other, then in step 1008 the terminal carries out a call termination process. In step 1006, if the subaddresses do not coincide with each other, the flow goes to step 1010 and the terminal ignores the message or call. [If in step 1004 or step 1012 the message does not include the called party subaddress, then in step 1008 a terminal which has responded earlier than other terminals carries out the call termination process. In all cases than the above, the message is ignored in step 1010.]

Control signals made in the subaddress decision unit 14 in the aforementioned steps are input to the switching unit 24.

When the input control signal allows the message to be received, the switching unit 24 operates such that image data received in the line control unit 10 are recorded through the receiving control unit 20 in the recorder 18, and when the input control signal does not allow a message to be received, the switching unit 24 operates such so that the calling message is ignored.

As mentioned above, in the conventional facsimile device, the image data are recorded on the recording paper not only when the subaddress set in the terminal itself coincides with the subaddress included in the calling message but also when the calling message does not include the called party subaddress.

The preferred embodiments of the present invention will now be described with reference to the accompanying drawings.

Figure 5:
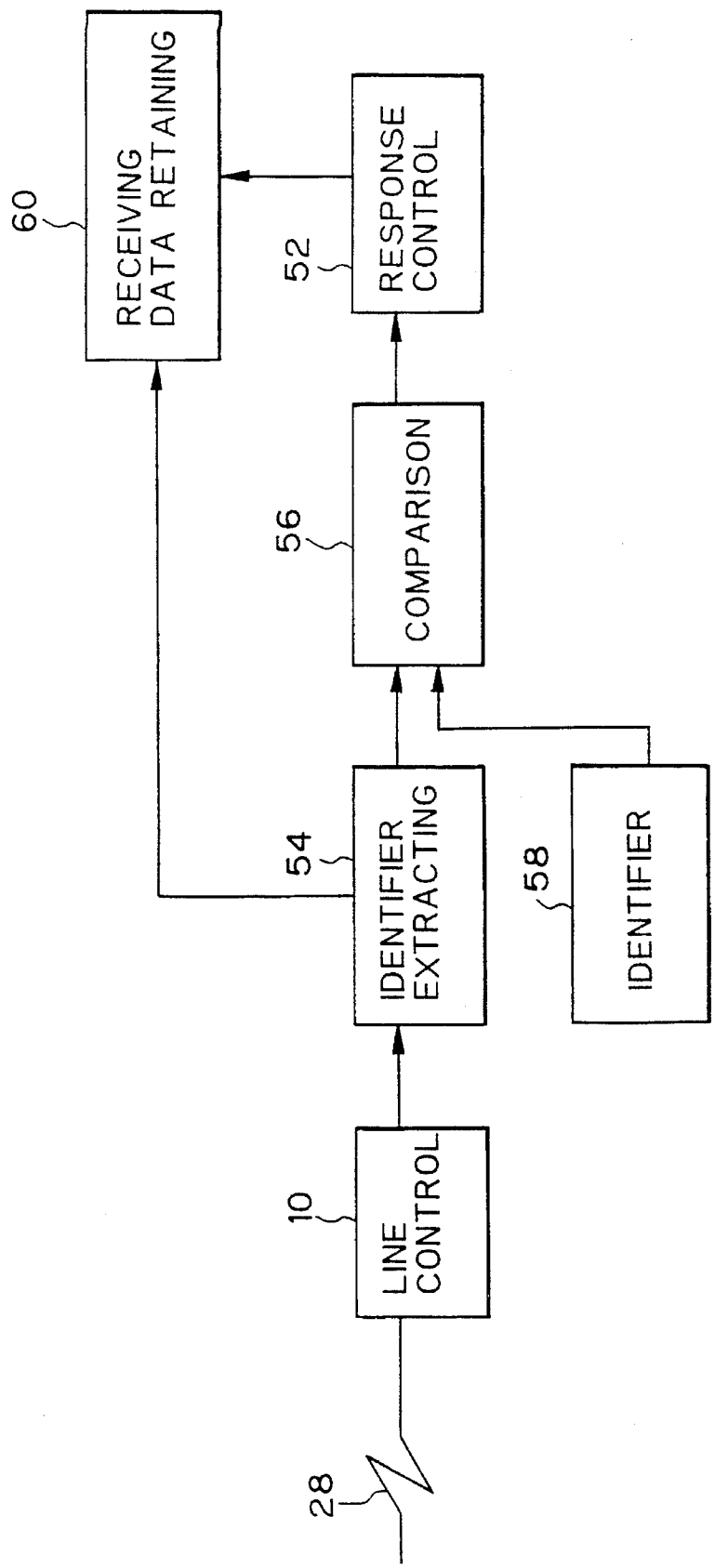
FIG. 5 is a block diagram showing a basic construction of a facsimile device according to a first embodiment of the present invention.

FIG. 5 is a block diagram showing a basic construction of a facsimile device for use in an ISDN, according to a first embodiment of the present invention.

The facsimile device comprises a response control unit 52 for responding to a calling message, an identifier extracting unit 54 for extracting a first identifier identifying a terminal of a called party from the calling message, and a comparison unit 56 for comparing the first identifier extracted in the identifier extracting unit 54 with a second identifier 58 of the device itself. When the first identifier can be extracted from the calling message received from the ISDN 28, the response control unit 52 responds to the message only when the extracted first identifier coincides with the second identifier 58 of the device itself, and does not respond when the identifiers do not coincide. When the first identifier cannot be extracted, the received image signals are stored in a receiving data retaining unit 60.

Figure 6:
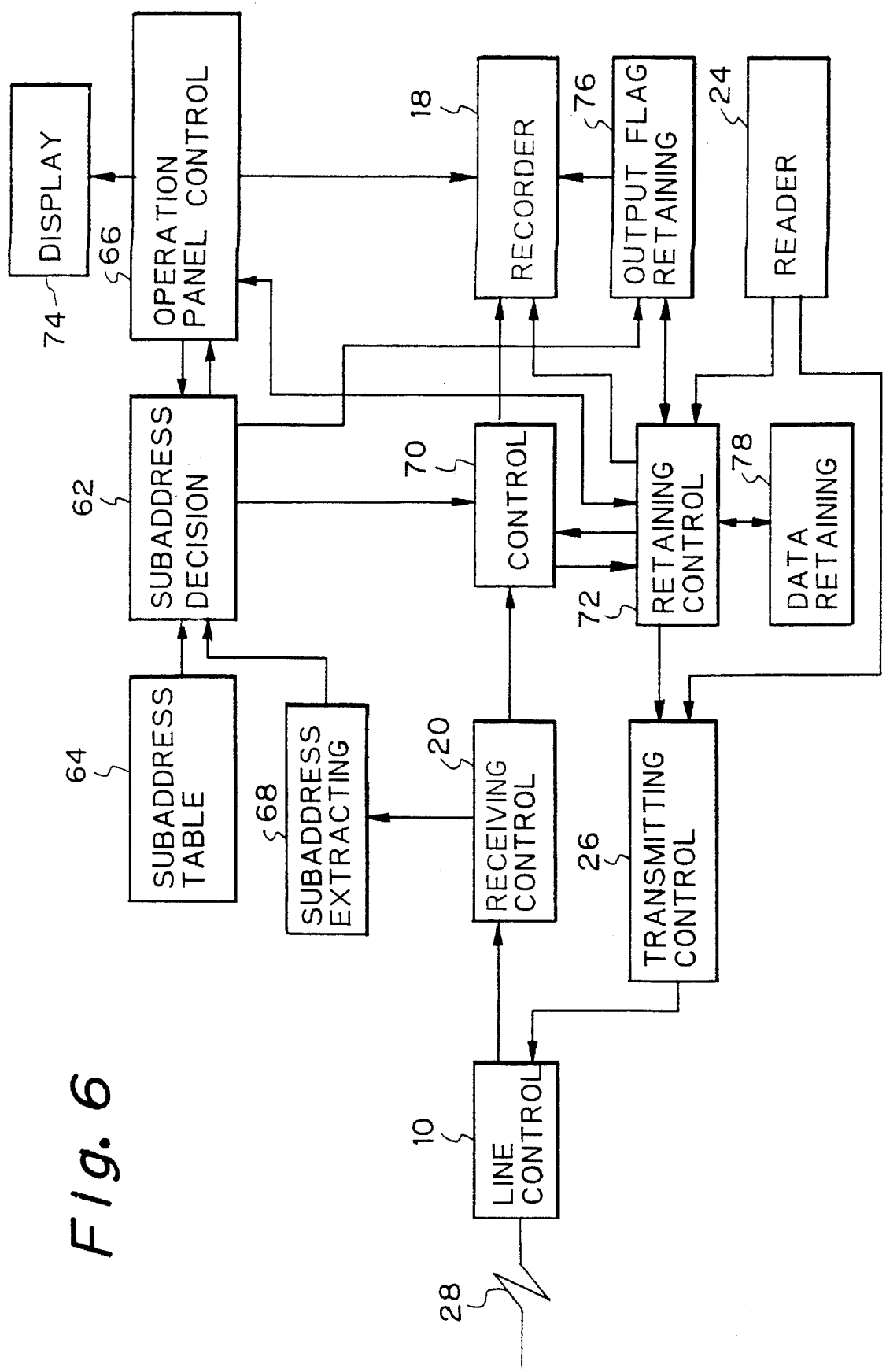
FIG. 6 is a block diagram showing a more detailed construction of the facsimile device according to the first to embodiment of the present invention.

FIG. 6 is a block diagram showing a more detailed construction of the facsimile device according to a first embodiment of the present invention.

In FIG. 6, the facsimile device comprises a subaddress decision unit 62 for deciding whether or not a called party subaddress included in a calling message coincides with a subaddress of the device stored in a subaddress table 64, an operation panel control unit 66 for receiving users commands and for displaying same to the user, a subaddress extracting unit 68 for extracting the called party subaddress from the calling message, a receiving control unit 20 for controlling operations according to signals output by the subaddress decision unit 62, a retaining control unit 72 for controlling an operation retaining image data, a display unit 74 for displaying same to a user, an output flag retaining unit 76 retaining an output flag for controlling a print-out operation, and a data retaining unit 78 for retaining the image data. Other constituents denoted by the same reference numerals as used in FIG. 1 are similar to those of FIG. 1.

After a line control unit 10 receives a calling message from an ISDN 28, the subaddress extracting unit 68 extracts a called party subaddress from the calling message, and sends the called party subaddress to the subaddress decision unit 62. The subaddress decision unit 62 compares the called party subaddress with a subaddress stored in the subaddress table 64. The subaddress decision unit 62 makes off an output flag retained in the output flag retaining unit 76, if the subaddress is stored in the subaddress table 64 and if the calling message does not include the called party subaddress. The output flag retaining unit 76 determines whether received image data are recorded on a recording paper or are retained in the data retaining unit 78 after a call termination process. The call termination process is carried out by the control unit 70. If the subaddress is stored in the subaddress table 64 and the calling message includes the called party subaddress, and if the subaddress coincide with each other, the subaddress decision unit 62 makes or sets the output flag to on, and thereafter, the call termination process is carried out by the control unit 70. If the subaddresses do not coincide with each other, the calling message is ignored. Further, if the subaddress is not stored in the subaddress table 64, and if the calling message includes the called party subaddress, the calling message is ignored. If the subaddress is not stored in the subaddress table 64, and if the calling message does not include the called party subaddress, the subaddress decision unit 62 makes the output flag on, and thereafter, the call termination process is carried out by the control unit 70.

Figure 7A:
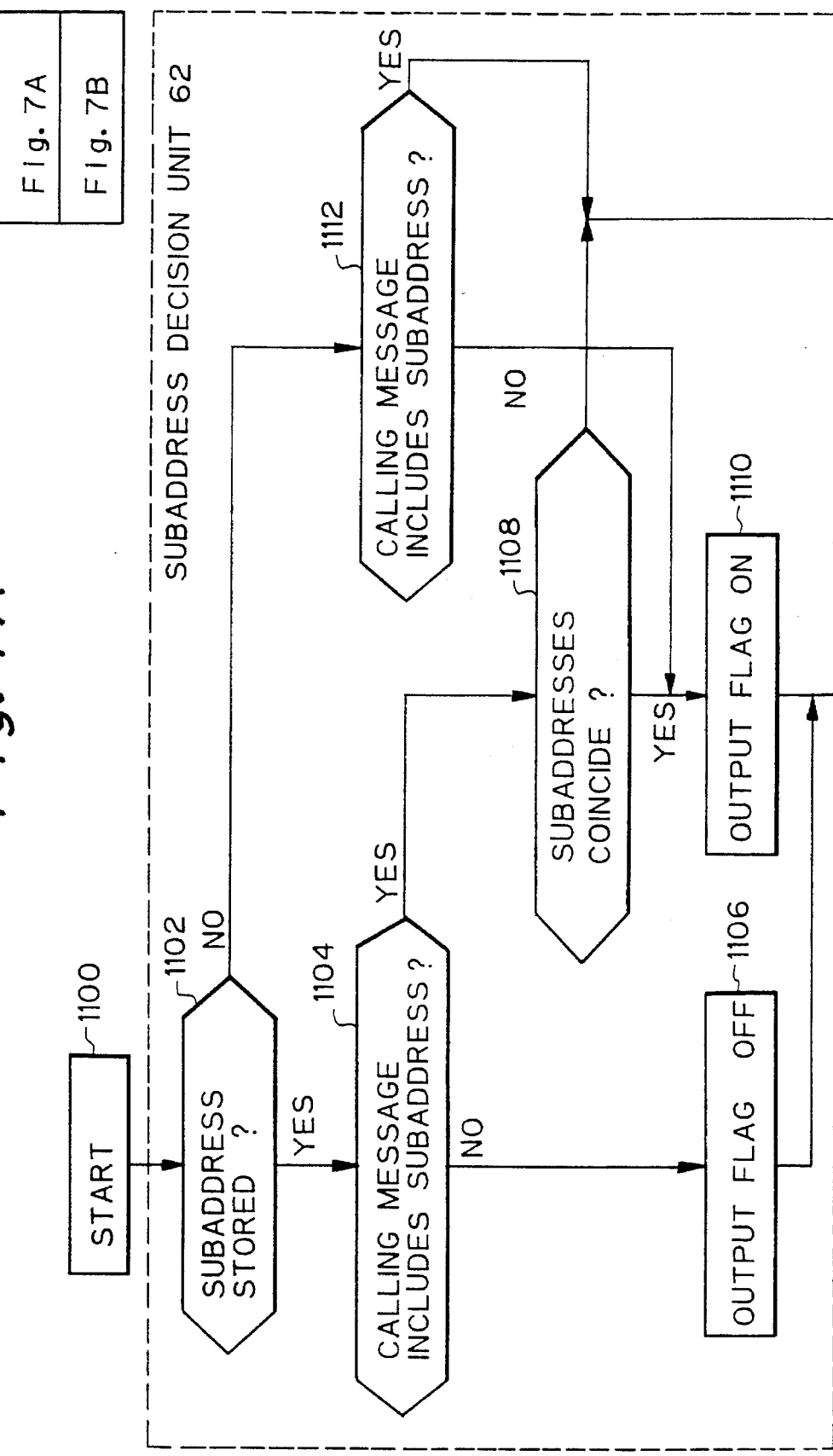
FIGS. 7A and 7B are flowcharts showing an operation of the first embodiment of the present invention.
Figure 7B:
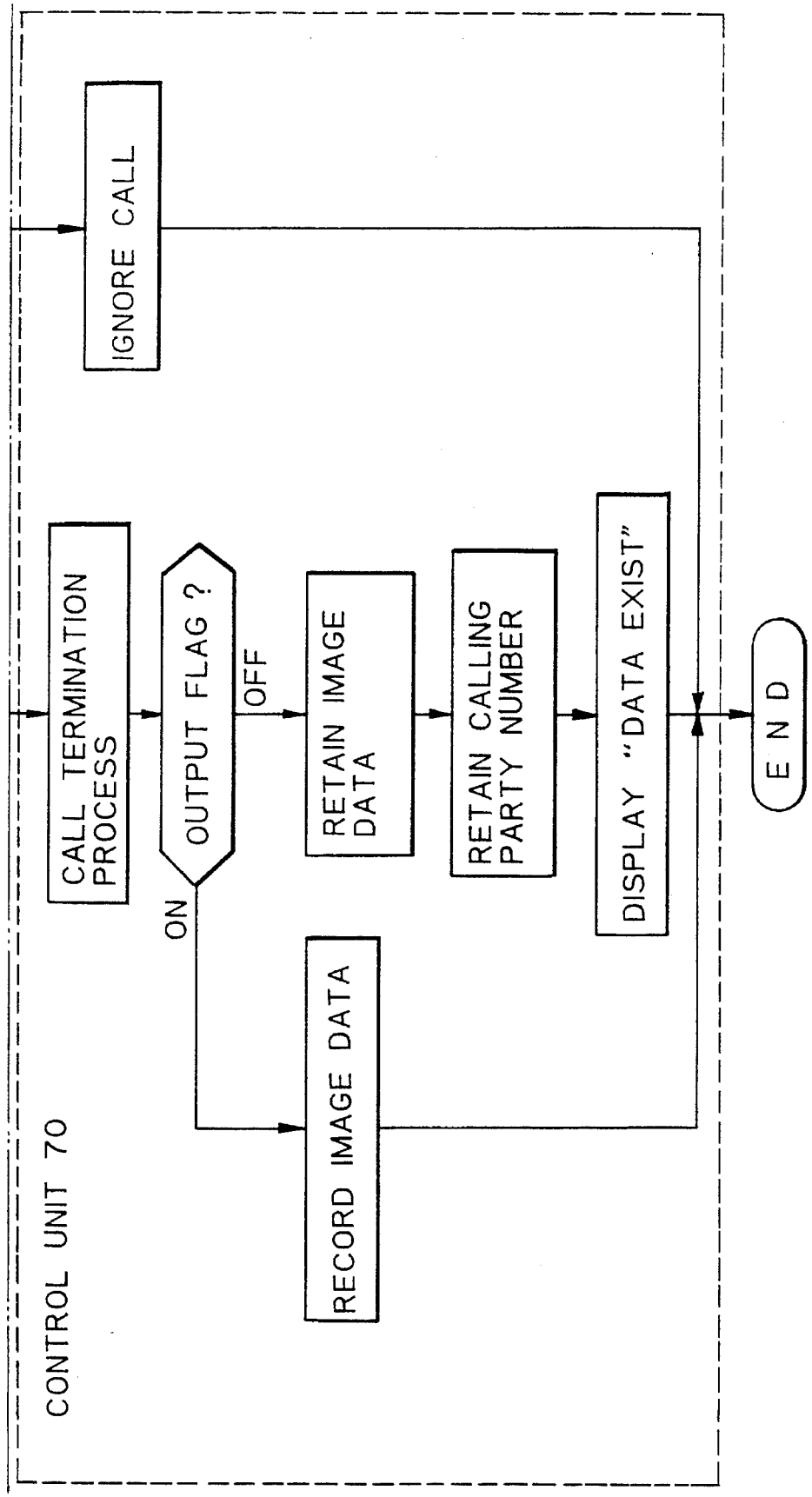

The aforementioned operations of the subaddress decision unit 62 are schematically shown in steps 1100 to 1112 of a flowchart of FIG. 7A. FIG. 7B shows the operations of the control unit 70 (step 1200 to 1214).

Figure 8:
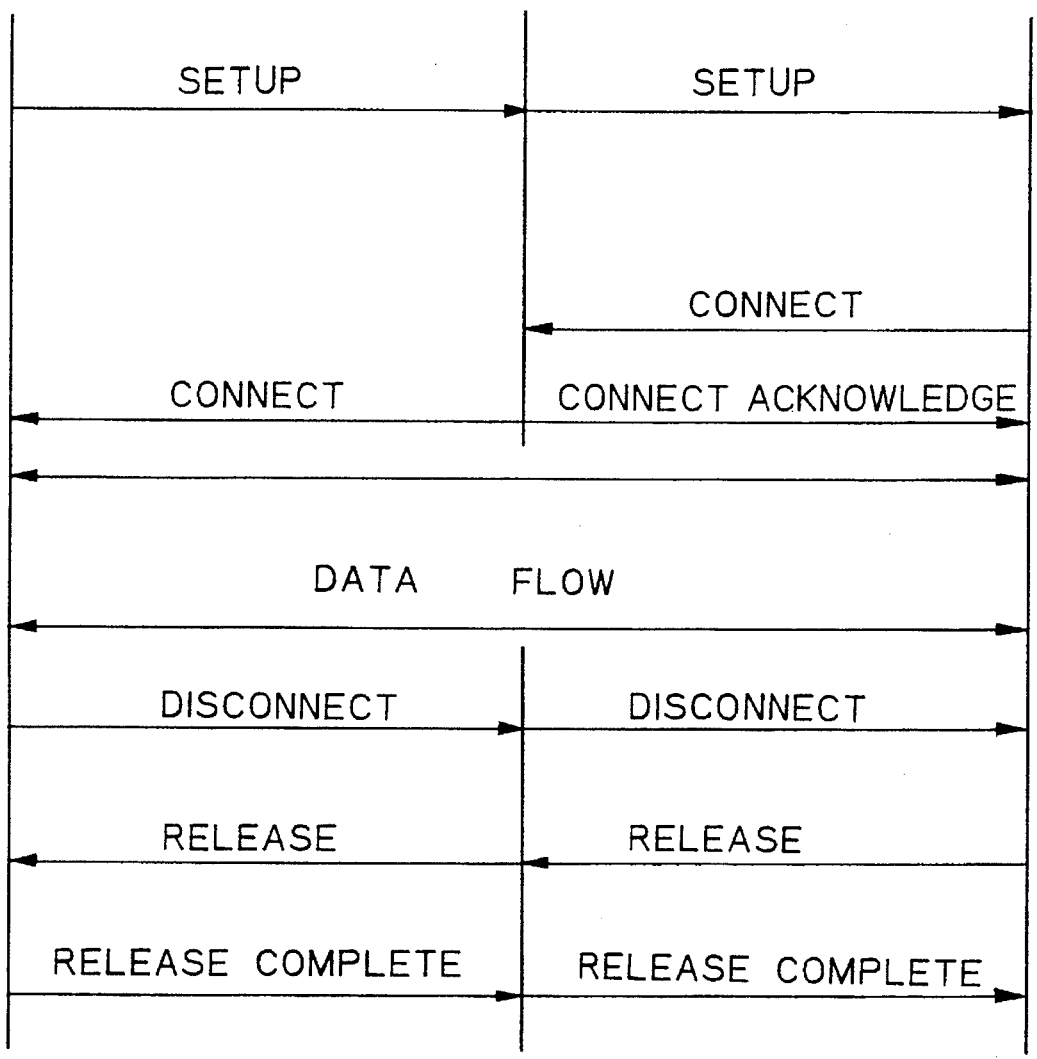
FIG. 8 is a diagram showing a protocol sequence where image data are received by the facsimile device.
Figure 9:
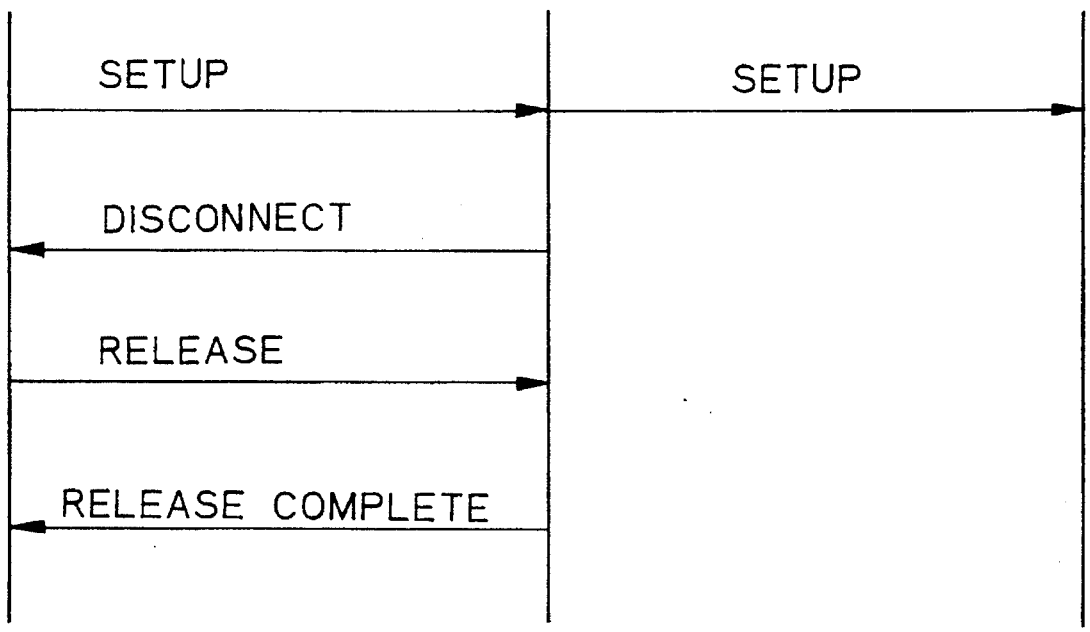
FIG. 9 is a diagram showing a protocol sequence where image data are not received by the facsimile device.

FIGS. 8 and 9 are diagrams showing protocol sequences between the network and the device.

FIG. 8 shows a protocol sequence where the calling message does not include the called party subaddress or the called party subaddress coincides with the subaddress of the device. First, a calling terminal sends a SETUP message to a network, and the network sends the SETUP message to the called terminal. The called terminal responds by sending a CONNECT message to the network, if a called party subaddress is not included in the SETUP message or the called party subaddress included in the SETUP message coincides with a subaddress of the terminal, the network then sends a CONNECT ACKNOWLEDGE message to a terminal which responded quickest or a terminal having a coinciding subaddress, and responds by sending a CONNECT message to the calling terminal. Then, a communication path for transferring image data is formed. For a disconnection, the calling terminal sends a DISCONNECT message to the network, and the network sends the DISCONNECT message to the called terminal. When receiving the DISCONNECT message, the called terminal sends a RELEASE message to the network, and the network sends the RELEASE message to the calling terminal. When receiving the RELEASE message, the calling terminal sends a RELEASE COMPLETE message to the network, the network sends the RELEASE COMPLETE message to the called terminal, and the communication path is then released.

FIG. 9 shows a protocol sequence where the subaddresses do not coincide. The calling terminal sends a SETUP message to the network, and the network sends the SETUP message to the called terminals. Since, however, the called terminals do not respond to the message when the subaddress does not coincide, the network sends a DISCONNECT message to the calling terminal after a predetermined time has passed. When receiving the DISCONNECT message, the calling terminal sends a RELEASE message to the network. Upon receiving the RELEASE message, the network releases the communication path and sends a RELEASE COMPLETE message to the calling terminal.

Returning to FIG. 7B, steps 1200 to 1214 shows an operation of the control unit 70. In step 1202, the control unit 70 examines the output flag, and if the output flag is on, in step 1210, the received image data are transferred to the recorder 18 to be recorded on a recording paper. If the output flag is off, in steps 1204 and 1206, the control unit 70 makes the retaining control unit 72 store the image data in the data retaining unit 78, and in step 1208, makes the operation control unit 66 display a message informing the user of the existence of the receiver data.

Figure 10:
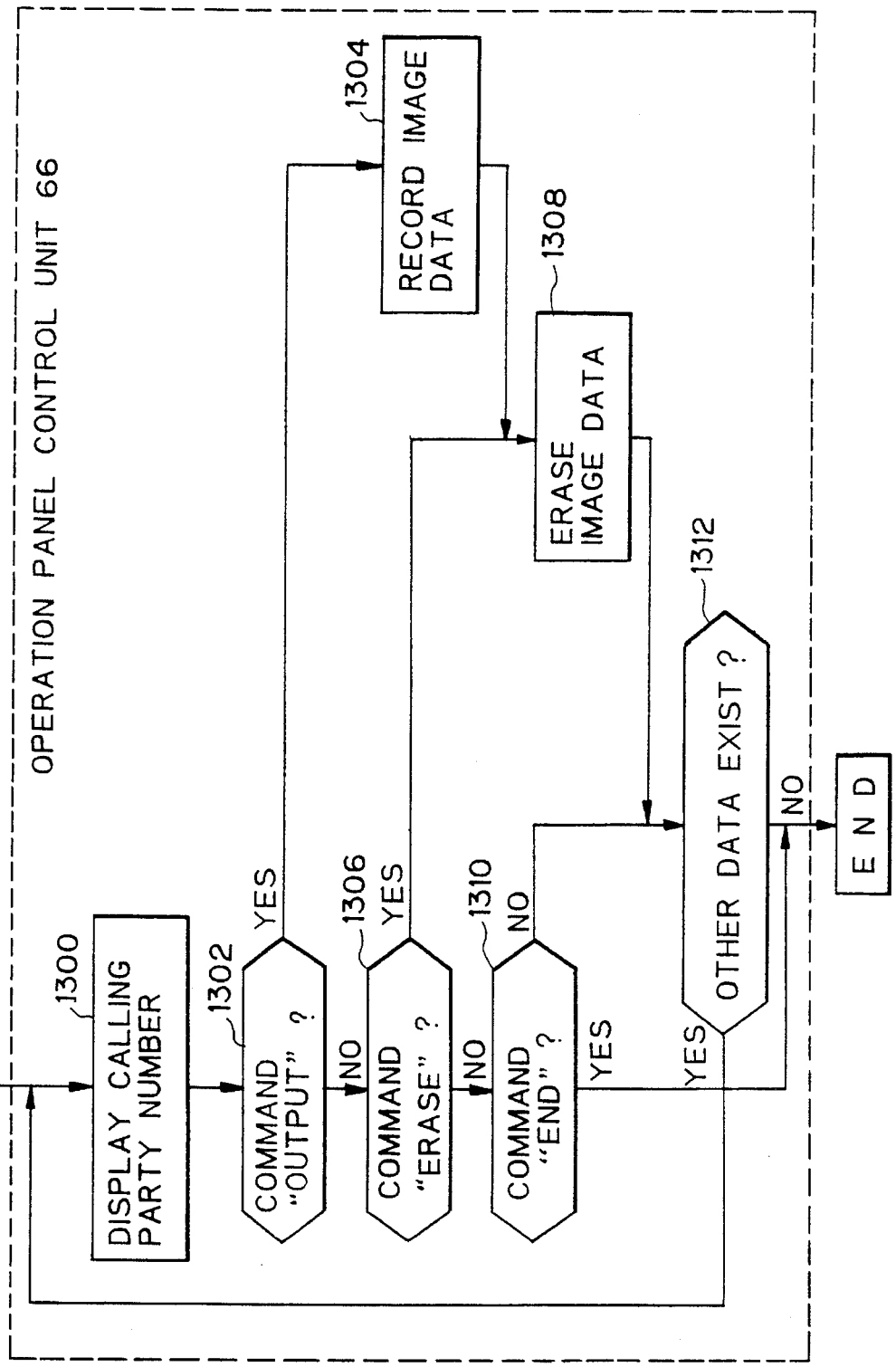
FIG. 10 is a flowchart showing an operation of the operation panel control unit 66.

FIG. 10 is a flowchart showing an operation of the operation panel control unit 66. The operation shown in FIG. 10 is executed when a user recognizes the existence of the received data by seeing the message displayed on the display unit 74.

In step 1300, the operation panel control unit 66 reads out the calling party number from the data retaining unit 78 and displays the calling party number on the display unit 74, according to a command input by the user. By looking at the display unit 74, the user can determine whether the received data is to be output or to be erased, or the operation is to be ended. The user then inputs a corresponding command. In step 1302, if the input command is "output", in step 1304, the operation panel control unit 66 makes the retaining control unit 72 transfer the received data to the recorder 18, to record the image data on the recording paper. In step 1306, if the input command is "erase", in step 1308 the operation panel control unit 66 makes the retaining control unit 72 erase the data.

As mentioned above, since the image data received with a calling message not including a calling party subaddress are temporarily stored, and the user can then either record or erase the image data after seeing the calling party number, a waste of recording paper due to a recording of unnecessary image data can be avoided.

Figure 11:
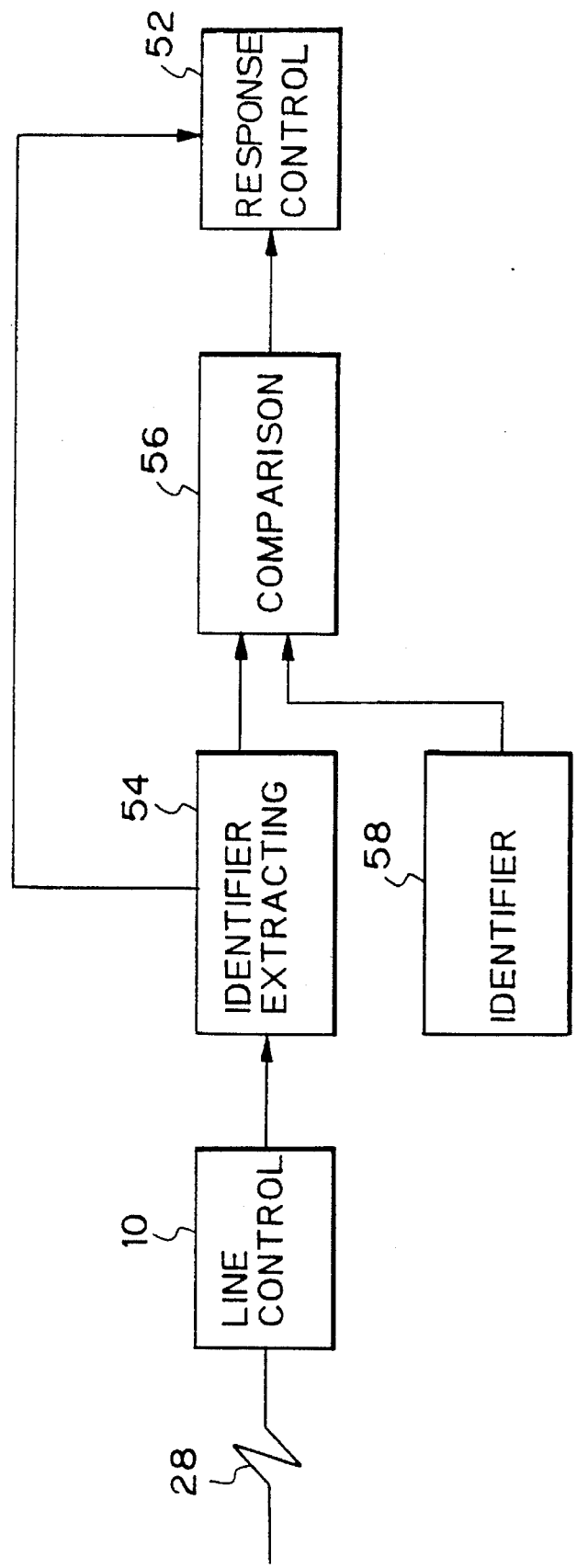
FIG. 11 is a block diagram showing a basic construction of a facsimile device according to a second embodiment of the present invention.

FIG. 11 is a block diagram showing a basic construction of a facsimile device according to a second embodiment of the present invention.

In this embodiment, the response control unit 52 ignores a calling message if a second identifier 58 of the device exists and if the first identifier is not extracted from the calling message in the identifier extracting unit 54.

Figure 12:
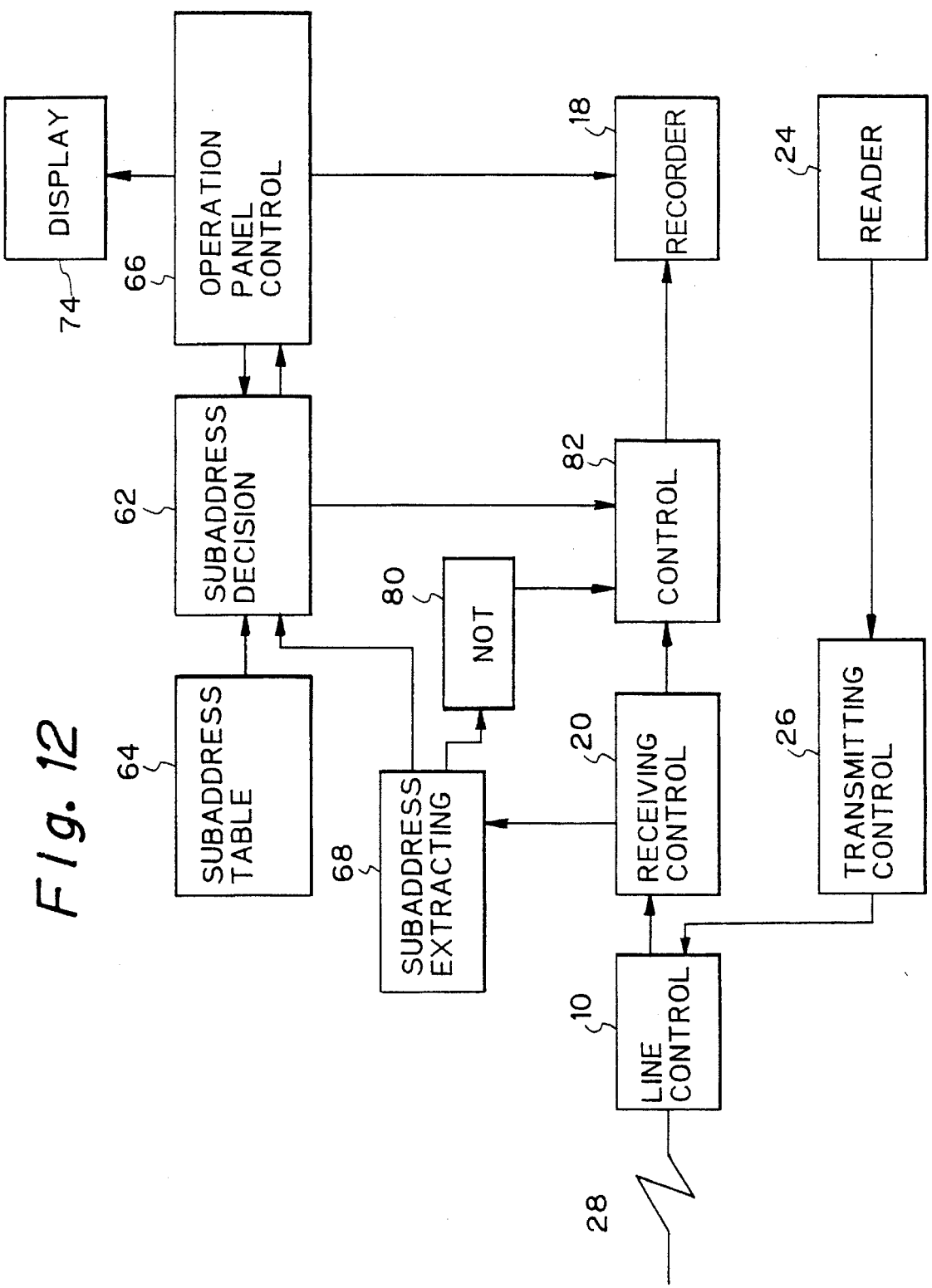
FIG. 12 is a block diagram showing a more detailed construction of the facsimile device according to the second embodiment of the present invention.

FIG. 12 is a block diagram showing a more detailed construction of the facsimile device according to a second embodiment of the present invention.

The device shown in FIG. 12 comprises a not circuit 80 and a control unit 82. Other constituents denoted by the same reference numerals as used in FIG. 6 are similar to those of FIG. 6. The not circuit 80 informs the control circuit 82 of the absence of a called party subaddress in a calling message.

Figure 13:
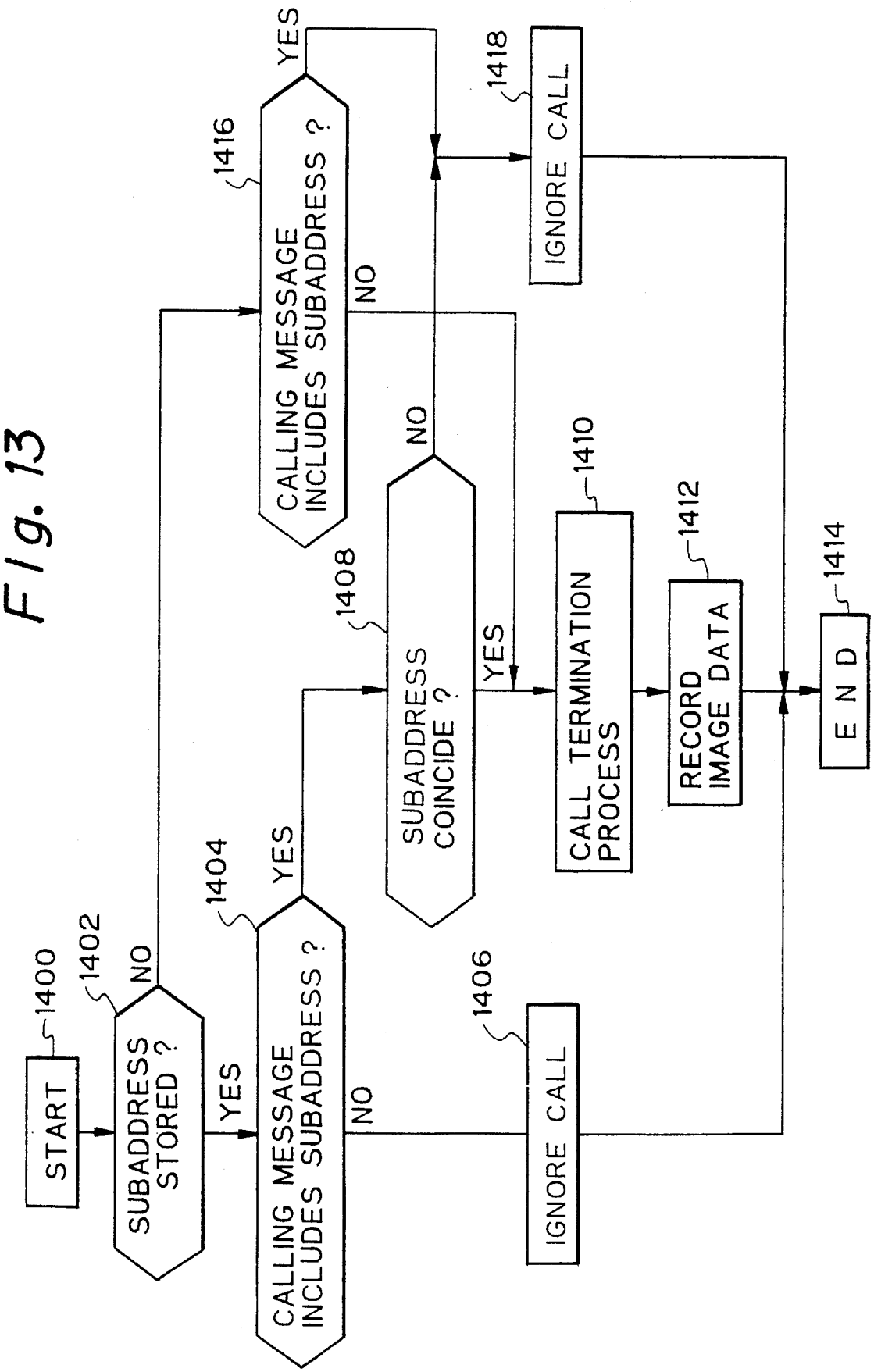
FIG. 13 is a flowchart showing an operation of the facsimile device according to the second embodiment of the present invention.
Figure 1:
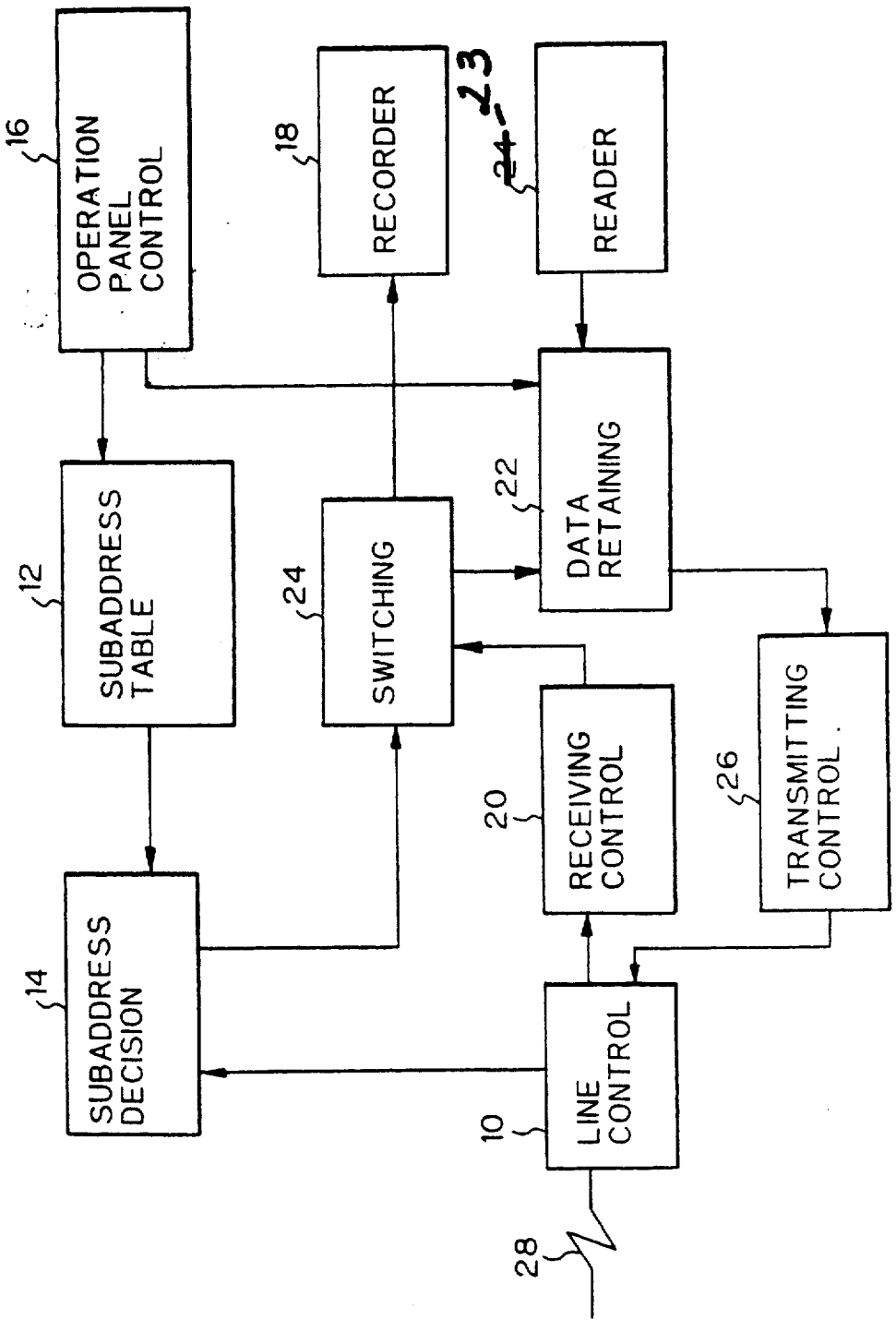
Figure 3:
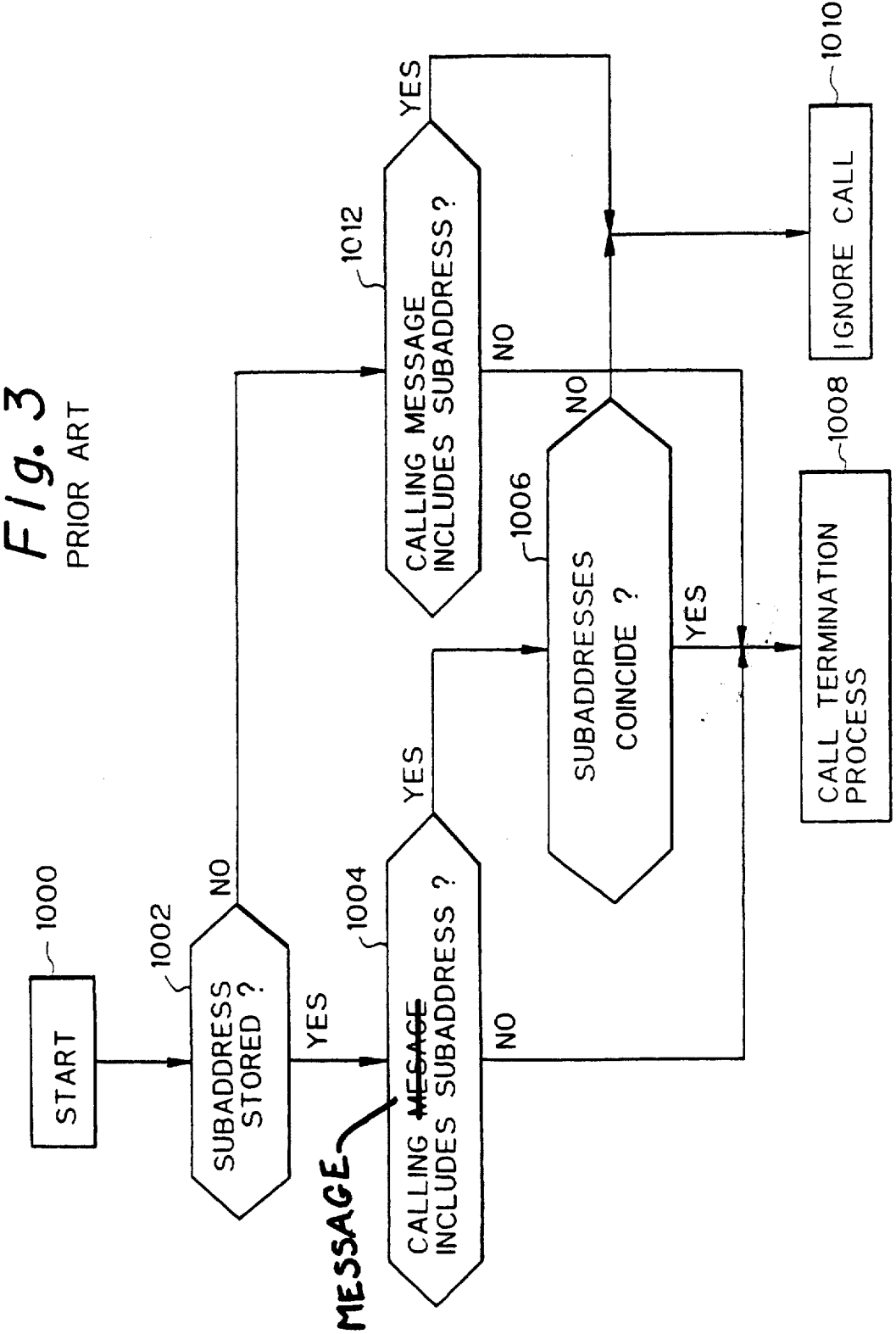
Figure 6:
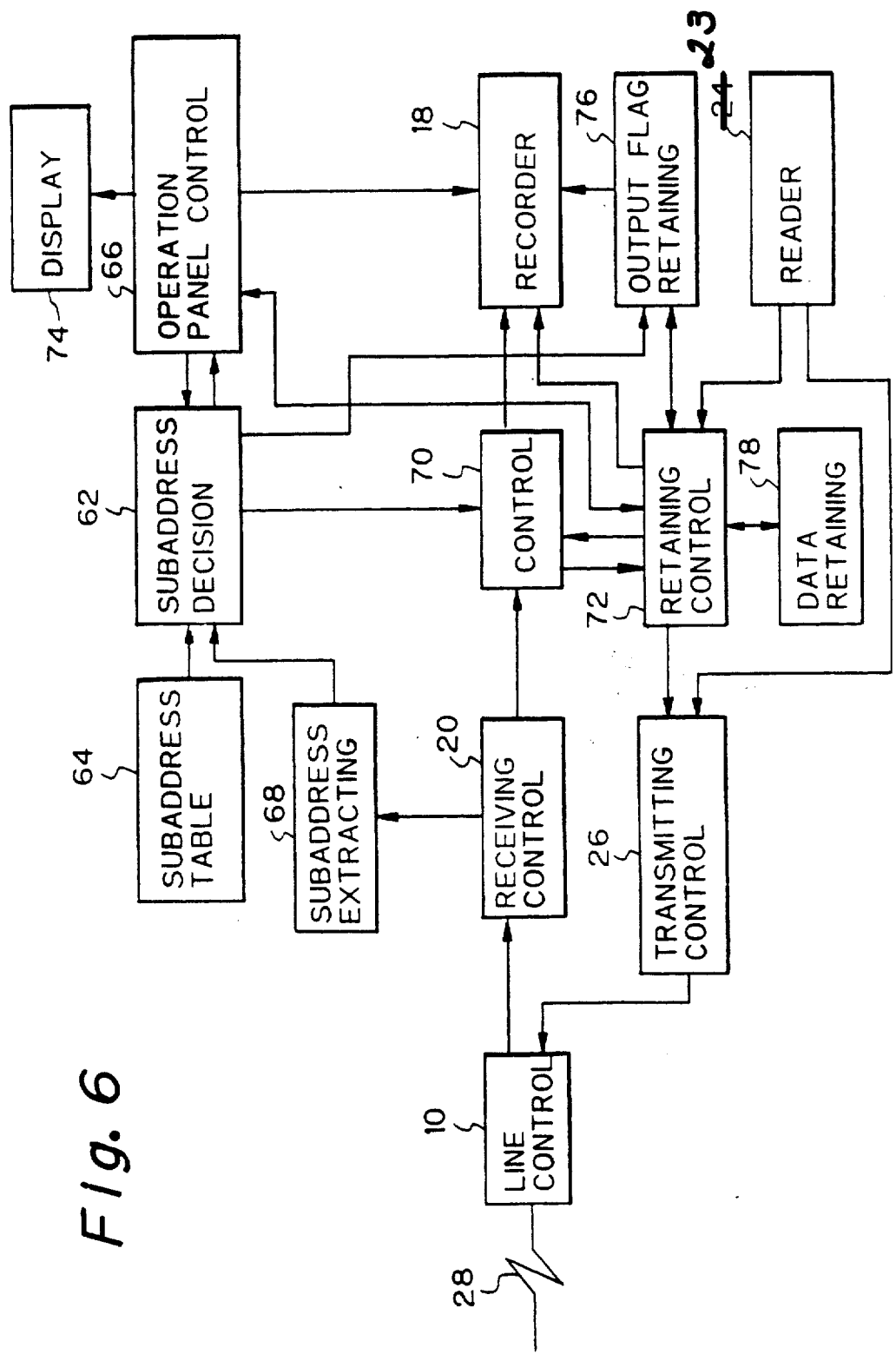
Figure 7B:
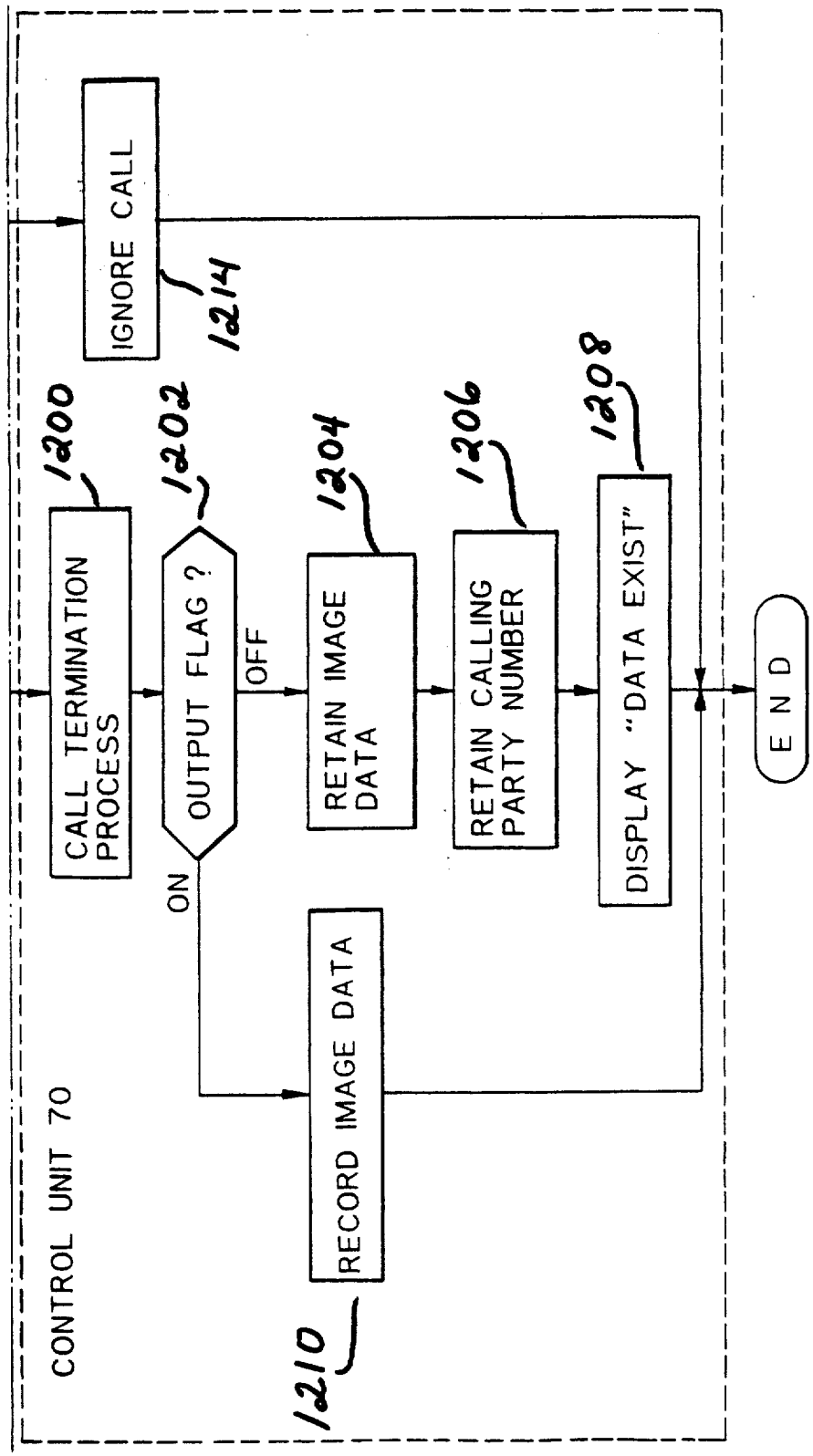
Figure 8:
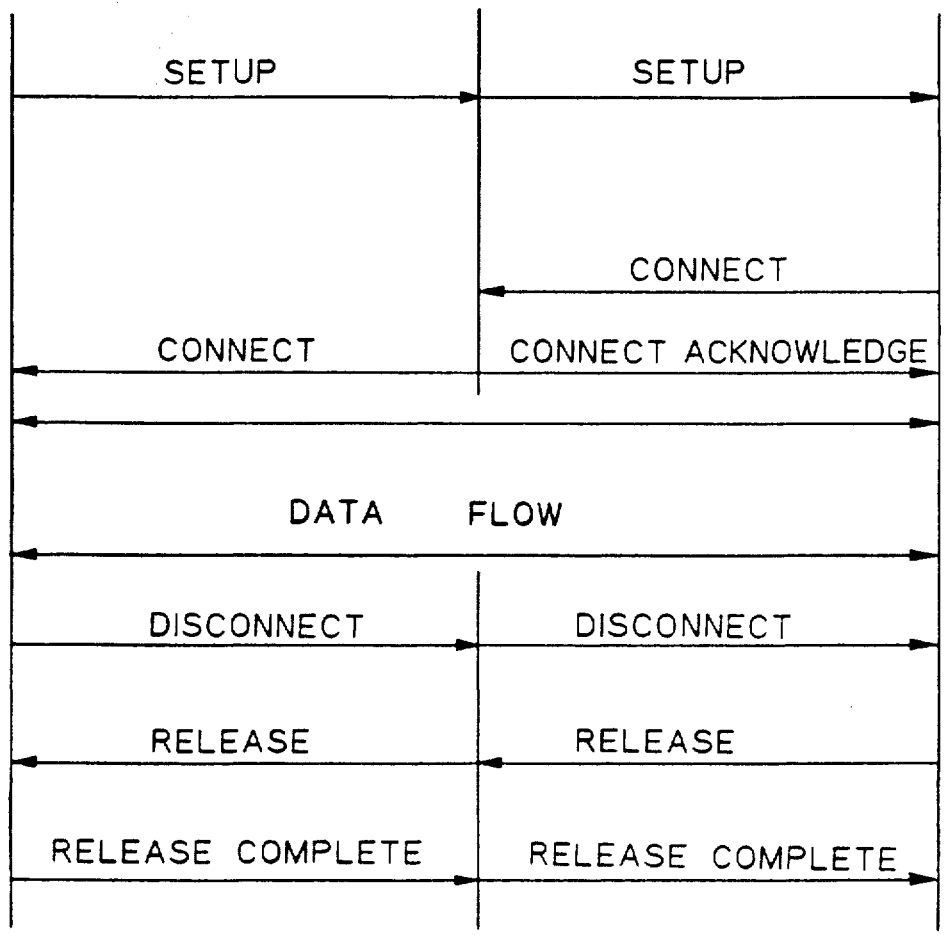
Figure 9:
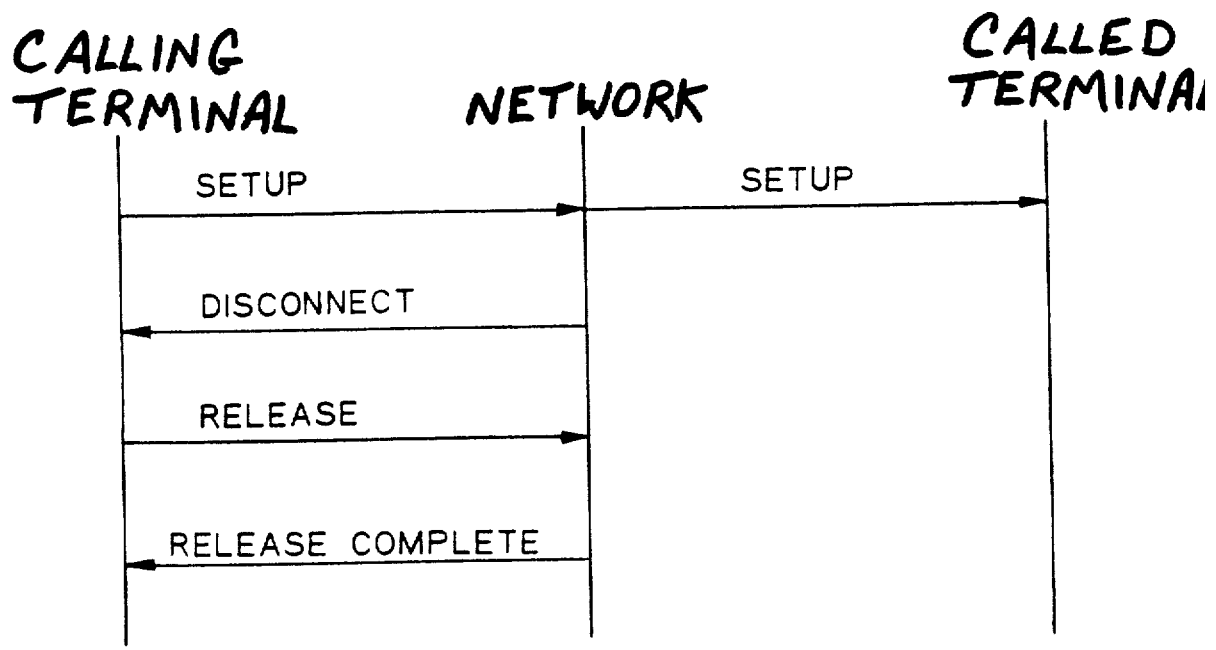
Figure 12:
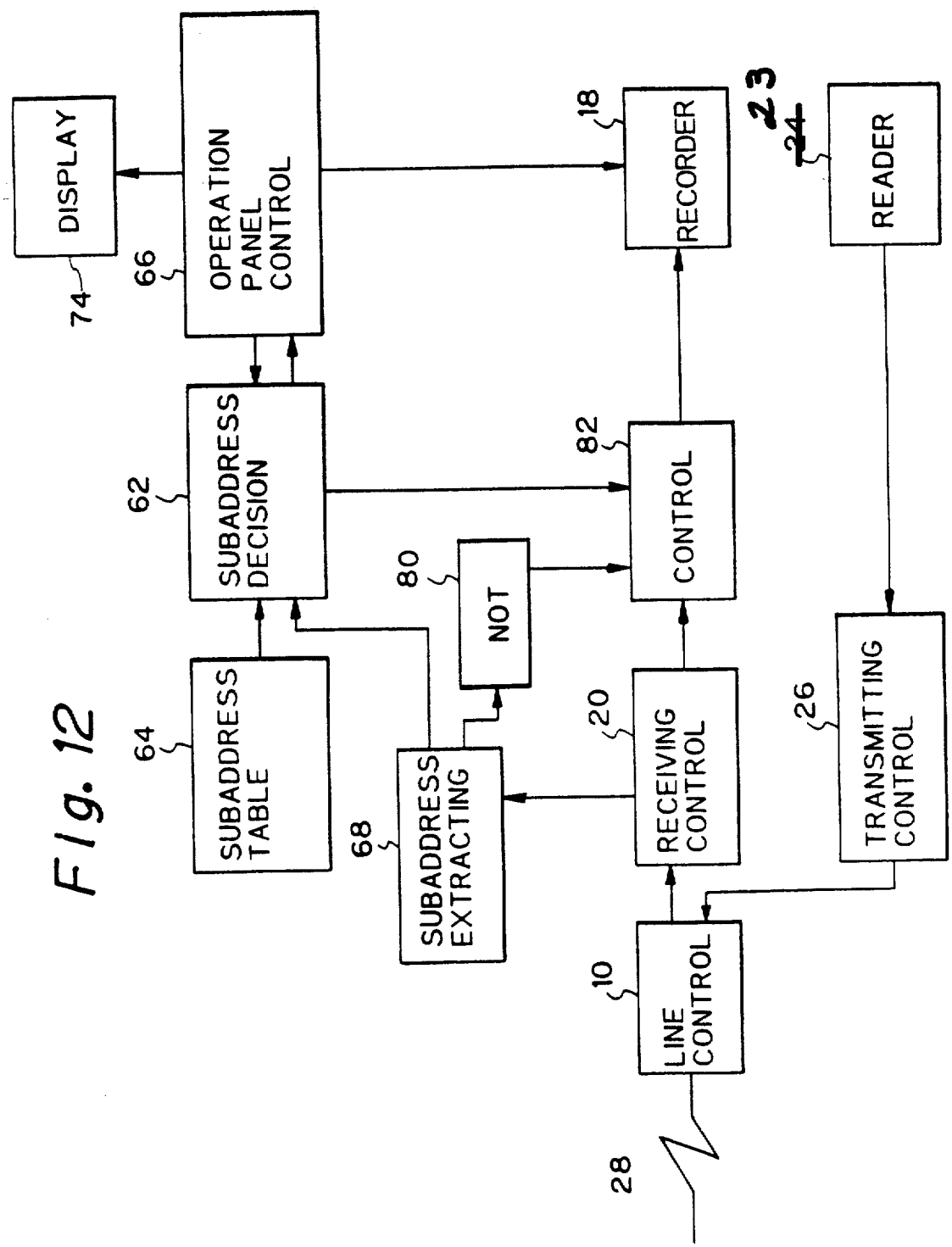

FIG. 13 is a flowchart showing an operation of the facsimile device according to the second embodiment of the present invention.

The difference from the operation of the conventional facsimile device as shown in FIG. 3 is that, if the subaddress of the device is not stored and if the not circuit 80 informs the control circuit 82 that the calling message does not include the called party subaddress, then in step 1406 the calling message is ignored.

Accordingly, even though the device does not have a subaddress, the calling message not including the called party subaddress is ignored, so that a waste of recording paper due to a recording of unnecessary image data can be avoided.

I claim:

1. A facsimile device which receives and records messages including image data from a digital network, wherein each of the messages includes a first identifier identifying a receiving facsimile device for receiving the image data, and wherein a second identifier to be compared with the first identifier is stored in the receiving facsimile device, said facsimile device comprising:

receiving means for receiving one of the messages from the digital network;

identifier extracting means for extracting the first identifier from said one of the messages received by the receiving means when said one of the messages includes the first identifier;

storing means for storing the second identifier;

comparison means for comparing the first identifier with the second identifier when the identifier extracting means extracts the first identifier and when the second identifier is stored in the storing means, to determine whether the first identifier coincides with the second identifier;

recording means for recording the image data;

received data retaining means for retaining the image data, to be one of recorded by the recording means and erased according to commands input by a user; and control means for controlling operations such that the receiving means receives the image data when any of the following conditions occur:

(a) the first identifier coincides with the second identifier, (b) said one of the messages does not include the first identifier while said storing means does not store the second identifier, and (c) said one of the messages does not include the first identifier while said storing means stores the second identifier, said control means recognizing all of conditions (a), (b) and (c) and controlling the operations such that the receiving means ignores said one of the messages when none of (a), (b) and (c) occur, such that the image data is retained in the received data retaining means but not automatically recorded when condition (c) occurs, and such that when condition (a) or (b) occurs, the image data is recorded by the recording means.

2. A facsimile device as claimed in claim 1, wherein the digital network is an Integrated Services Digital Network.

3. A facsimile device as claimed in claim 2, wherein the first identifier is a called party subaddress defined by the Integrated Services Digital Network and the second identifier is a subaddress of the facsimile device.

4. A facsimile device which receives and records messages including image data from a digital network, wherein each of the messages includes a first identifier identifying a receiving facsimile device for receiving the image data, and wherein a second identifier to be compared with the first identifier is stored in the receiving facsimile device, said facsimile device comprising:

receiving means for receiving one of the messages from the digital network;

identifier extracting means for extracting the first identifier from said one of the messages received by the receiving means when said one of the messages includes the first identifier;

storing means for storing the second identifier;

comparison means for comparing the first identifier with the second identifier when the identifier extracting means extracts the first identifier and when the second identifier is stored in the storing means, to determine whether the first identifier coincides with the second identifier;

recording means for recording the image data; and control means for controlling operations such that the receiving means receives the image data to be recorded by the recording means when any of the following conditions occur:

(a) the first identifier coincides with the second identifier and (b) said one of the messages does not include the first identifier while said storing means does not store the second identifier and, when neither of conditions (a) and (b) occurs, the receiving means ignores said one of the messages, said control means recognizing both of conditions (a) and (b).

5. A facsimile device as claimed in claim 4, wherein the digital network is an Integrated Services Digital Network.

6. A facsimile device as claimed in claim 5, wherein the first identifier is a called party subaddress defined by the Integrated Services Digital Network and the second identifier is a subaddress of the facsimile device.

7. A method of controlling a facsimile device which receives and records messages including image data from a digital network, wherein each of the messages includes a first identifier identifying a receiving facsimile device for receiving the image data, and wherein a second identifier to be compared with the first identifier is stored in the receiving facsimile device, said method comprising the steps of:

receiving one of the messages which may include the first identifier;

extracting the first identifier from said one of the messages when said one of the messages includes the first identifier;

comparing the first identifier with the second identifier when the first identifier is extracted and when the second identifier is stored, to determine whether the first identifier coincides with the second identifier;

receiving said one of the messages including the image data when any of the following conditions occur:
(a) the first identifier coincides with the second identifier
(b) said one of the messages does not include the first identifier while the second identifier is not stored, and
(c) the first identifier is not included in said one of the messages while the second identifier is stored, and when none of said conditions (a), (b) and (c) occur, ignoring the message;

recognizing all of conditions (a), (b) and (c); and retaining the image data to be one of recorded and erased according to commands input by a user when said condition (c) occurs, and when said conditions (a) or (b) occur, recording the image data.

8. A method of controlling a facsimile device as claimed in claim 7, wherein the digital network is an Integrated Services Digital Network.

9. A method of controlling a facsimile device as claimed in claim 8, wherein the first identifier is a called party subaddress defined by the Integrated Services Digital Network and the second identifier is a subaddress of the facsimile device.

10. A method of controlling a facsimile device which receives and records messages including image data from a digital network, wherein each of the messages includes a first identifier identifying a receiving facsimile device for receiving the image data, and wherein a second identifier to be compared with the first identifier is stored in the receiving facsimile device, said method comprising the steps of:

receiving one of the messages which may include the first identifier;

extracting the first identifier from said one of the messages when said one of the messages includes the first identifier;

comparing the first identifier with the second identifier when the first identifier is extracted and when the second identifier is stored, to determine whether the first identifier coincides with the second identifier; and receiving said one of the messages including the image data to be recorded when any of the following conditions occur:
(a) the first identifier coincides with the second identifier or
(b) said first identifier is not included in the one of the messages, while the second identifier is not stored, and recognizing both of conditions (a) and (b), when neither of conditions (a) and (b) occur, ignoring said one of the messages.

11. A method of controlling a facsimile device as claimed in claim 10, wherein the digital network is an Integrated Services Digital Network.

12. A method of controlling a facsimile device as claimed in claim 11, wherein the first identifier is a called party subaddress defined by the Integrated Services Digital Network and the second identifier is a subaddress of the facsimile device.

* * * * *

UNITED STATES PATENT AND TRADEMARK OFFICE
CERTIFICATE OF CORRECTION

PATENT NO. : 5,557,425

DATED : September 17, 1996

INVENTOR(S) : Hasegawa

It is certified that error appears in the above-indentified patent and that said Letters Patent is hereby corrected as shown below:

IN THE DRAWINGS

Fig. 1, change "24" to --23--.

Fig. 3, change "CALLING MESAGE" to --CALLING MESSAGE--.

Fig. 6, change "24" to --23--.

Fig. 7B, insert box labels as follows:
 insert "1210" to "RECORD IMAGE DATA" box,
 insert "1200" to "CALL TERMINATION PROCESS" box,
 insert "1202" to "OUTPUT FLAG ?" box,
 insert "1204" to "RETAIN IMAGE DATA" box,
 insert "1206" to "RETAIN CALLING PARTY NUMBER" box,
 insert "1208" to "DISPLAY "DATA EXIST"" box, and
 insert "1214" to "IGNORE CALL" box.

Fig. 8, insert "CALLING TERMINAL", "NETWORK", and "CALLED TERMINAL", as indicated on attached drawing sheet.

Fig. 9, insert "CALLING TERMINAL", "NETWORK", and "CALLED TERMINAL", as indicated on attached drawing sheet.

UNITED STATES PATENT AND TRADEMARK OFFICE
CERTIFICATE OF CORRECTION

PATENT NO. : 5,557,425
DATED : September 17, 1996
INVENTOR(S) : Hasegawa

It is certified that error appears in the above-indentified patent and that said Letters Patent is hereby corrected as shown below:

Fig. 12, change "24" to --23--.

(SEE ATTACHED SHEETS)

Signed and Sealed this

Twenty-first Day of October 1997

Attest:

Attesting Officer

BRUCE LEHMAN

Commissioner of Patents and Trademarks